(12) United States Patent
Chou

(10) Patent No.: US 10,110,095 B2
(45) Date of Patent: Oct. 23, 2018

(54) MOTOR STRUCTURE CAPABLE OF DISSIPATING HEAT THEREIN

(71) Applicant: Wen-San Chou, Tainan (TW)

(72) Inventor: Wen-San Chou, Tainan (TW)

( * ) Notice: Subject to any disclaimer, the term of this patent is extended or adjusted under 35 U.S.C. 154(b) by 280 days.

(21) Appl. No.: 15/283,928

(22) Filed: Oct. 3, 2016

(65) Prior Publication Data

US 2017/0104390 A1    Apr. 13, 2017

(30) Foreign Application Priority Data

Oct. 7, 2015   (TW) ................................. 104133108

(51) Int. Cl.
| | |
|---|---|
| *H02K 5/20* | (2006.01) |
| *H02K 9/06* | (2006.01) |
| *H02K 9/14* | (2006.01) |
| *H02K 9/28* | (2006.01) |

(52) U.S. Cl.
CPC ................. *H02K 9/06* (2013.01); *H02K 5/20* (2013.01); *H02K 9/14* (2013.01); *H02K 9/28* (2013.01)

(58) Field of Classification Search
CPC ..... H02K 9/02–9/06; H02K 9/14–9/16; H02K 5/18; H02K 5/20
See application file for complete search history.

(56) References Cited

U.S. PATENT DOCUMENTS

| 4,742,257 A | * | 5/1988 | Carpenter | ................ H02K 9/14 310/57 |
| 6,570,276 B1 | * | 5/2003 | Morel | ................... F04D 25/082 310/52 |
| 7,804,208 B2 | * | 9/2010 | Hui | .......................... H02K 9/04 310/227 |
| 2006/0250039 A1 | * | 11/2006 | Yamamoto | ............ F04D 25/082 310/90 |
| 2014/0021812 A1 | * | 1/2014 | Hashish | ................... H02K 9/14 310/63 |

* cited by examiner

*Primary Examiner* — Ramon M Barrera

(57) ABSTRACT

A motor structure includes a housing, a cover, an air collecting structure fixed to the cover, an air guiding shell mounted around the housing and the air collecting structure, and a cooling fan. The cover defines a plurality of inlet holes. The air collecting structure defines a plurality of through holes aligned with the inlet holes of the cover, so as to provide a path for allowing one portion of the air current generated by the cooling fan to enter the housing. The housing defines a plurality of inlet holes and a plurality of outlet holes. One portion of the air guiding shell is located above the inlet holes of the housing to form another path for allowing another portion of the air current to enter the housing.

8 Claims, 9 Drawing Sheets

MOTOR STRUCTURE CAPABLE OF DISSIPATING HEAT THEREIN

TECHNICAL FIELD OF THE INVENTION

The present invention relates to a motor structure capable of dissipating heat therein and, more particularly, to a motor which can effectively dissipate the heat generated in its housing through multiple paths, so that heat is not easy to accumulate in the motor's housing, and thus the performance and service life of the motor can be increased.

DESCRIPTION OF THE PRIOR ART

In today's industry, motors are one of commonly used devices for providing mechanical power. However, while a motor is running, heat is easy to accumulate in the motor's housing. If the heat is not timely dissipated, the magnetic field provided by the magnets in the motor's housing will decrease, so that the performance of the motor can be gradually reduced. Besides, when the temperature in the motor rises to a certain level, the coils or enamel wires in the motor can be damaged, and this may cause a short circuit, and thus the motor may burn out. For preventing such a problem, a motor is usually provided with a cooling fan. However, the air current generated by the cooling fan of the motor can merely flow along the outer surface of the motor's housing, but cannot flow into the interior of the motor, and thus the capacity of dissipating the heat generated in the motor is limited. The problem of heat accumulation in the motor's housing has not yet been solved completely.

SUMMARY OF THE INVENTION

One object of the present invention is to provide a motor, which can effectively dissipate the heat generated in its housing through multiple paths.

According to one feature of the present invention, the motor generally includes a housing, a cover, an air collecting structure, a rotating shaft, and a cooling fan. The housing has a surrounding wall defining therein an inner space with a front opening and has a rear closure wall opposite to the front opening. The rear closure wall defines a central hole and a plurality of outlet holes. The cover, which closes the front opening of the housing, has a central hub defining a central hole and defines a plurality of inlet holes around the central hub thereof. The air collecting structure, which is adapted to be fixed to the cover, has a central hub defining a central hole aligned with the central hole of the cover for allowing the rotating shaft to insert therethrough and has an outer ring around the central hub of the air collecting structure and defines a plurality of through holes, located between the outer ring and the central hub of the air collecting structure and aligned with the inlet holes of the cover, whereby a central portion of a whirling, ongoing air current generated by the cooling fan can flow through the space between the outer ring and the central hub of the air collecting structure and then flow through the through holes of the air collecting structure and the inlet holes of the cover to enter the inner space of the housing and finally flow out of the housing via the outlet holes for dissipating the heat generated in the housing.

According to another feature of the present invention, an air guiding shell is mounted around the housing and the air collecting structure to define an annular air-guiding channel therebetween which communicates the inlet holes of the housing and faces the cooling fan, whereby an outer portion of the air current can quickly pass through the annular air-guiding channel and the inlet holes of the housing to enter the housing to take away the heat generated in the housing, so that maximum power output of the motor can be achieved, and thus the performance and service life of the motor can be increased.

According to one advantage of the present invention, the motor can be used in a high-temperature environment without being damaged. In a test, the motor was continuously operated in a closed space of 70 degrees C. for a long time without burning out.

Other objects, advantages, and novel features of the present invention will become more apparent from the following detailed description when taken in conjunction with the accompanying drawings.

DETAILED DESCRIPTION OF THE PREFERRED EMBODIMENTS

Since the structure and operational principles of a motor have been known widely, a detailed description for the constituent parts thereof is not provided in the following paragraphs.

Figure 1:
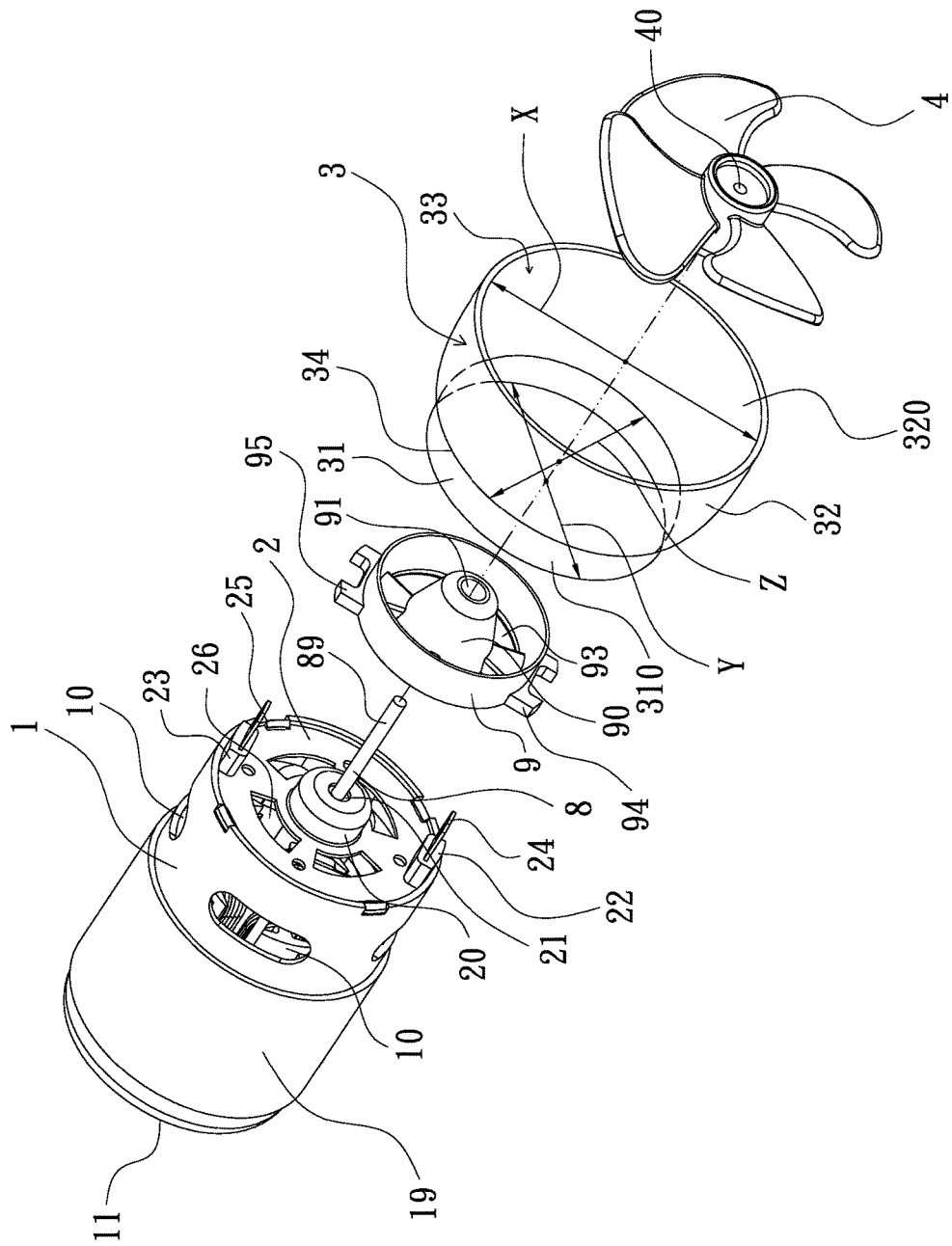
FIG. 1 shows an exploded view of a motor according to one embodiment of the present invention.
Figure 2:
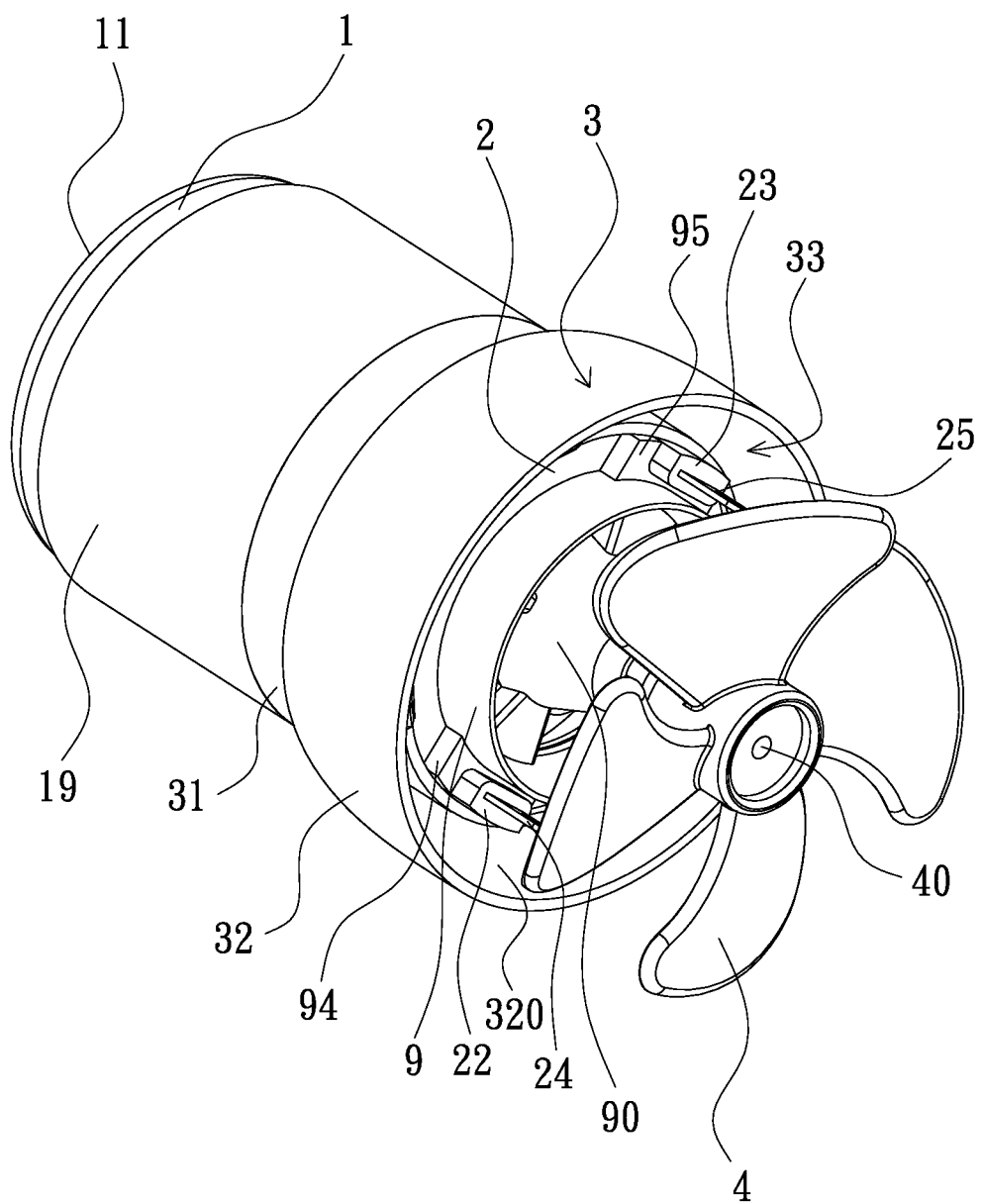
FIG. 2 shows a 3-dimensional view of the motor.
Figure 3:
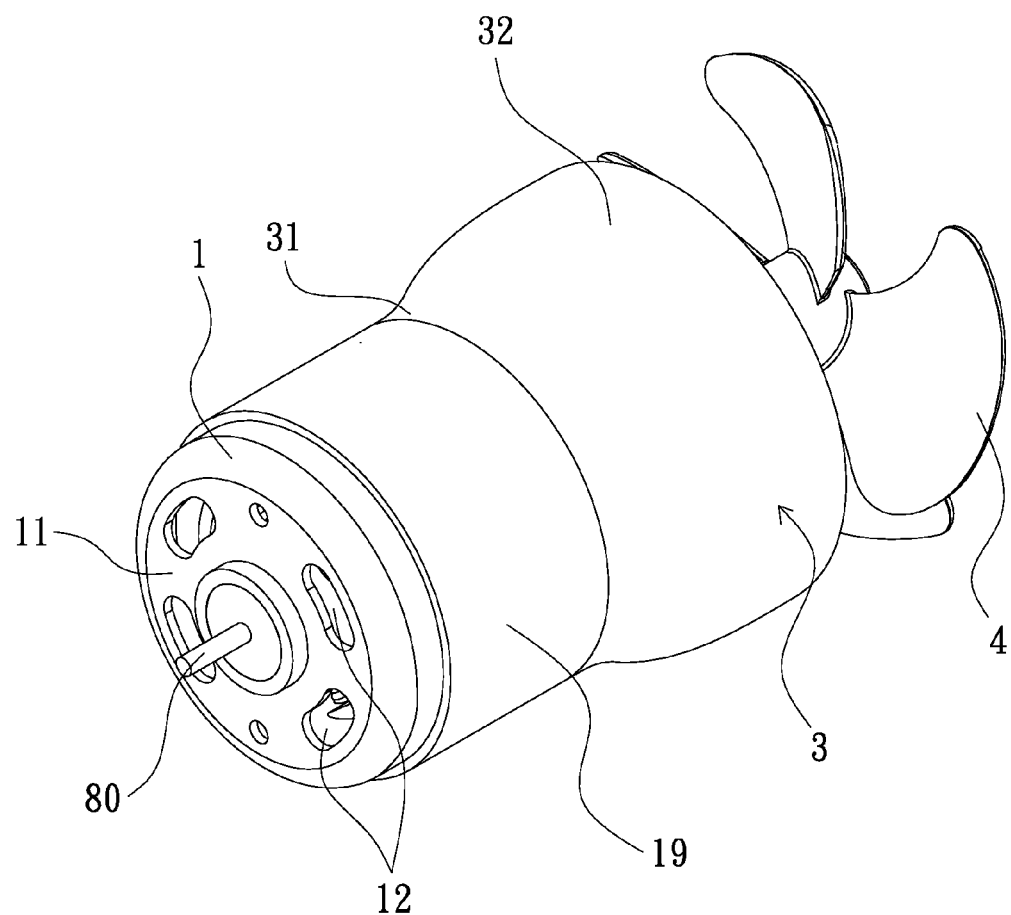
FIG. 3 shows another 3-diemensional view of the motor, which is viewed from a different angle than FIG. 2.
Figure 4:
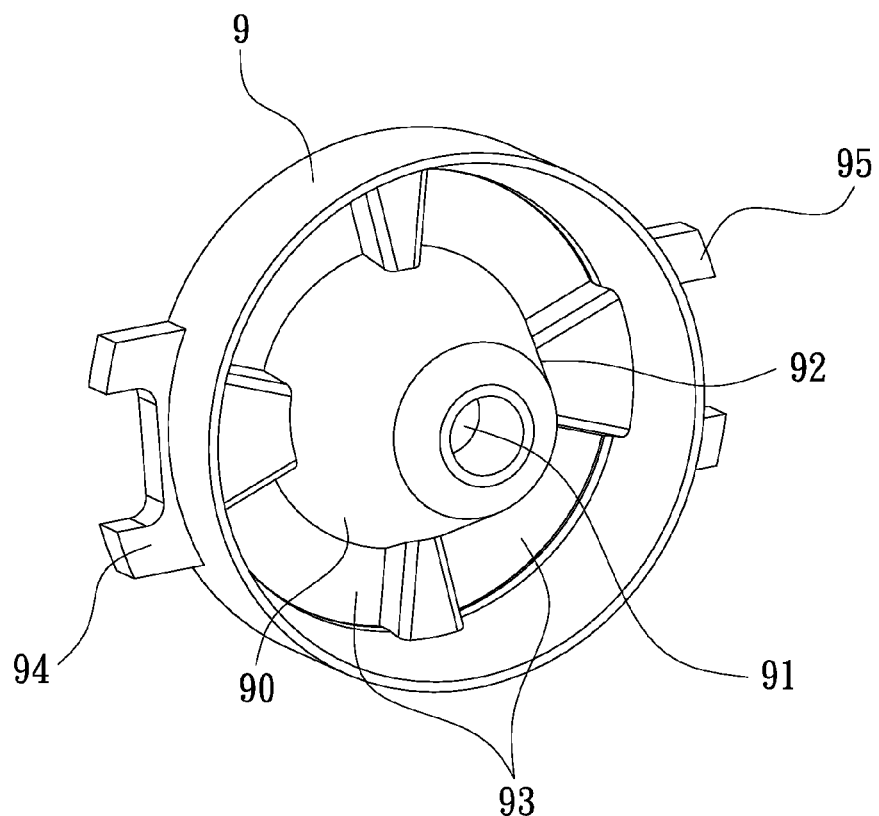
FIG. 4 shows an air collecting structure, which can be fixed to a cover used in the motor.
Figure 6:
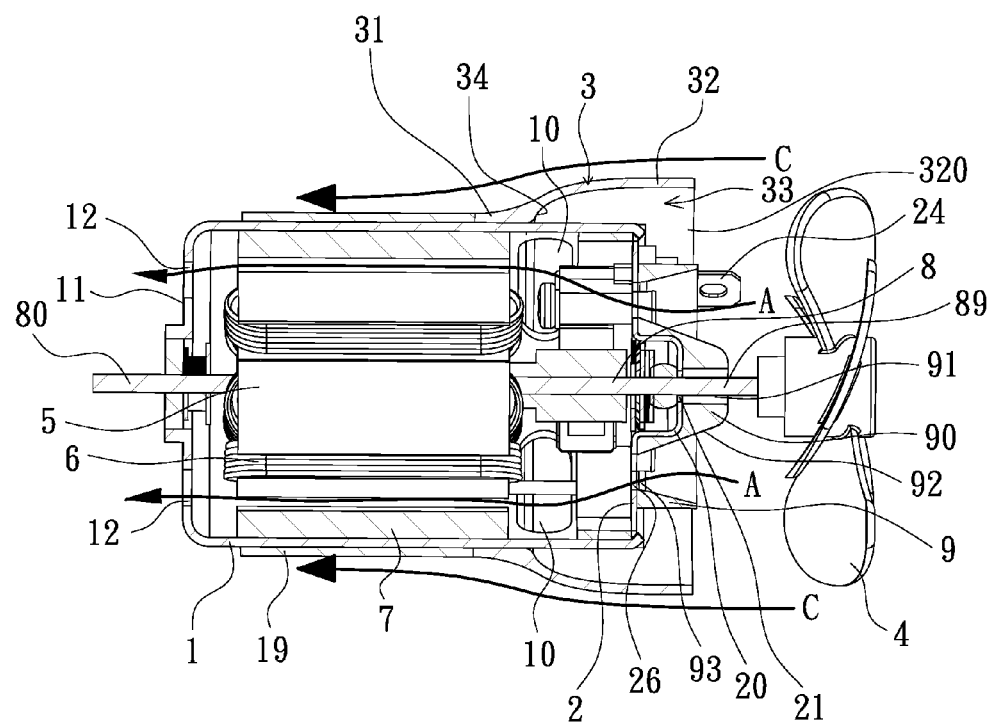
FIG. 6 shows a sectional view of the motor taken along line A-A in FIG. 5, wherein some of the air current, which follows the airflow path (A) to enter the motor's housing for dissipating the heat generated in the motor, and some of the air current, which follows the airflow path (C) to cool down the motor's housing for dissipating the heat generated in the motor, are manifested.
Figure 7:
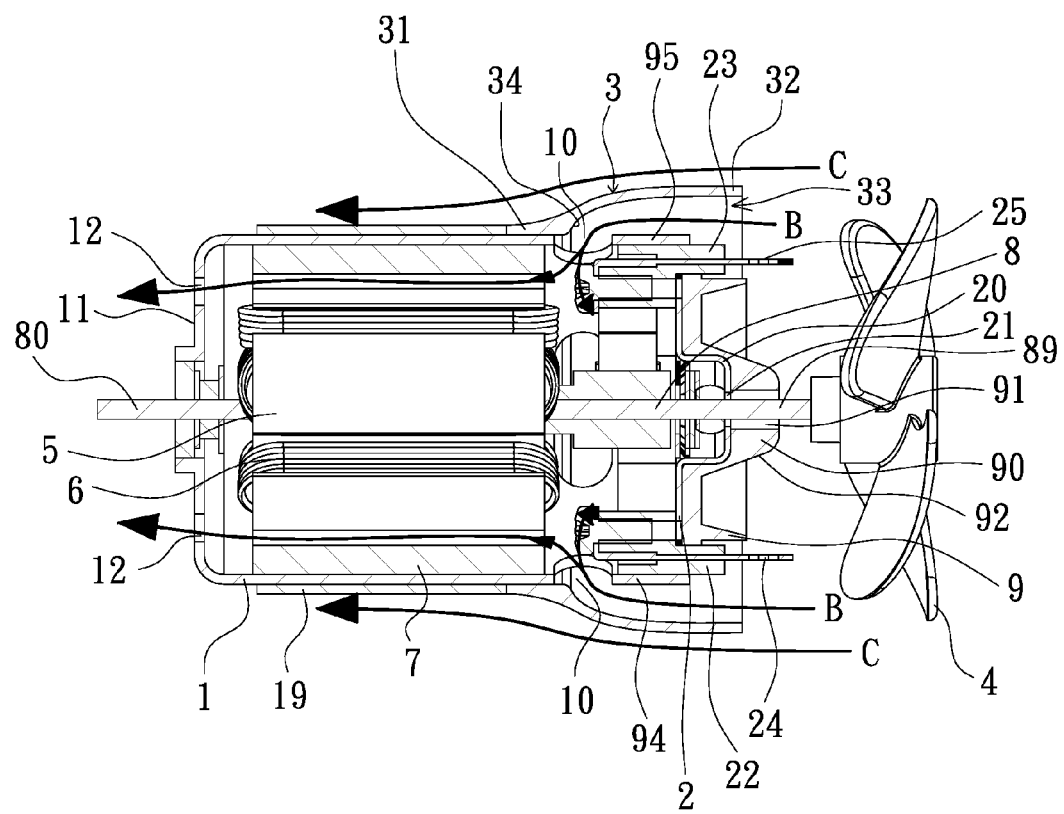
FIG. 7 shows a sectional view of the motor, wherein some of the air current, which follows the airflow path (B) to enter the motor's housing for dissipating the heat generated in the motor, and some of the air current, which follows the airflow path (C) to cool down the motor's housing for dissipating the heat generated in the motor, are manifested.
Figure 9:
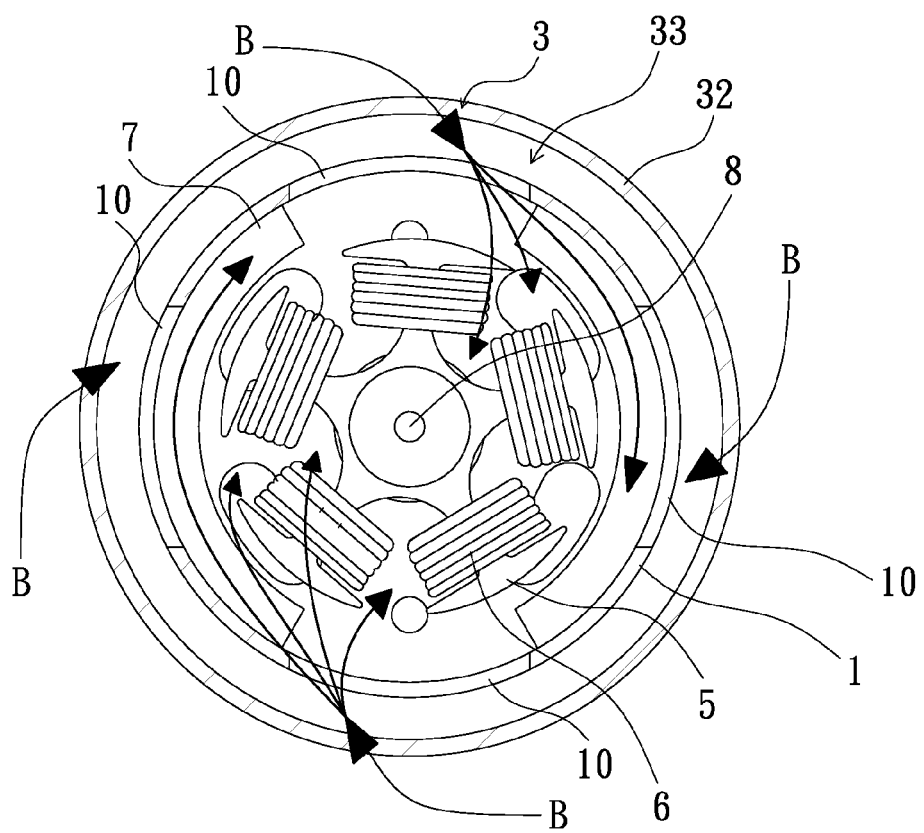
FIG. 9 shows a sectional view of the motor, wherein some of the air current, which follows the airflow path (B) to enter the motor's housing for dissipating the heat generated in the motor, is manifested.

Referring first to FIGS. 1 through 3, a motor according to one embodiment of the present invention is shown, which generally includes a cylindrical housing 1, a cover 2, an air collecting structure 9, an air guiding shell 3, a rotating shaft 8, and a cooling fan 4. The housing 1 has a surrounding wall, which defines therein an inner space with a front opening, and has a rear closure wall 11 opposite to the front opening The rear closure wall 11 defines a central hole, in which a bearing may be mounted, and a plurality of outlet holes 12 around the central hole. The surrounding wall of the housing 1 defines a plurality of inlet holes 10, through which outside air may enter the inner space of the housing 1. Furthermore, a rotor 5, coils 6 and magnets 7, which are necessary elements for a motor, are provided in the housing 1 (see FIGS. 6, 7 and 9). The rotating shaft 8 is mounted across the inner space of the housing 1, wherein the rotating shaft 8 has a first end 80 which is inserted through the central hole of the rear closure wall 11 for connecting with a transmission mechanism (not shown) for providing necessary mechanical power. The rotating shaft 8 has a second end 89 which is inserted out of the front opening of the housing 1 to be fitted with the cooling fan 4, as will be further illustrated below. A magnetically permeable sleeve 19, which can be made of metal, is closely fitted around the outer surface of the surrounding wall of the housing 1, to increase the performance of the motor.

The cover 2, which is substantially disk-shaped and closes the front opening of the housing 1, has a central hub 20 defining a central hole 21 and defines a plurality of inlet holes 26 around the central hub 20. The cover 2 is engaged with two sheaths 22, 23 provided at the housing 1, so that the cover 2 is installed to the housing 1 and closes the front opening of the housing 1. Furthermore, two electrical terminal blades 24, 25 provided at the housing 1 are inserted through the two sheaths 22, 23 to facilitate electrical connection for the motor. In this embodiment, the air collecting structure 9 is provided with two U-shaped members 94, 95, capable of engaging with the two sheaths 22, 23 extending out of the cover 2, so that the air collecting structure 9 can be fixed to the cover 2. Also, the air collecting structure 9 has a central hub 90, which can be aligned with the central hub 20 of the cover 2, and an outer ring around the central hub 90 and defines a plurality of through holes 93, located between the outer ring and the central hub 90 and aligned with the outlet holes 26 of the cover 2, wherein the central hub 90 has a conical surface 92, and defines a central hole 91 for allowing the second end 89 of the rotating shaft 8 to insert therethrough. The central hub 90 tapers off from its round base which is formed integrally with other portions of the air collecting structure 9; namely, the diameter of a cross section of the central hub 90 is gradually reduced as compared to the round base of the central hub 90. While the cover 2 is being installed to the housing 1, the second end 89 of the rotating shaft 8 can be inserted through the central hole 21 of the cover 2 and the central hole 91 of the air collecting structure 9, wherein a bearing (not shown) may be provided in the central hub 20 of the cover 2 and fitted with the rotating shaft 8.

As shown in FIG. 1, the cooling fan 4 defines a central hole 40, into which the second end 89 of the rotating shaft 8 extending out of the central hole 21 of the cover 2 and the central hole 91 of the air collecting structure 9 can be fitted, so that the cooling fan 4 is attached to and rotated together with the rotating shaft 8.

The air guiding shell 3 has a neck portion 31, a head portion 32, which has a dimension greater than the neck portion 31, and a gradually enlarged transitional portion integrally formed between the neck portion 31 and the head portion 32. The neck portion 31 opens out at a first opening 310, and the head portion 32 opens out at a second opening 320, which is opposite to the first opening 310. The air guiding shell 3 is mounted around the housing 1 and the air collecting structure 9, such that the neck portion 31 thereof is closely fitted around the housing 1, and the head portion 32 thereof is located above the inlet holes 10 of the housing 1, thus defining an annular air-guiding channel 33, between the head portion 32 and the housing 1, which communicates with the inlet holes 10 and forms an intercepting surface 34 at an inner surface of the gradually enlarged transitional portion of the air guiding shell 3, wherein the inlet holes 10 are located between the intercepting surface 34 and the second opening 320 of the air guiding shell 3. The annular air-guiding channel 33 faces towards the cooling fan 4. Preferably, the first and second openings 310, 320 of the air guiding shell 3 are circular in shape, and the air guiding shell 3 is a bell-shaped or funnel-shaped body such that the annular air-guiding channel 33 has a cross-sectional dimension which increases gradually from the intercepting surface 34 to the second opening 320 of the air guiding shell 3. The first opening 310 of the air guiding shell 3 has a diameter of (Y), the second opening 320 of the air guiding shell 3 has a diameter of (X), and the gradually enlarged transitional portion of the air guiding shell 3 generally has an internal diameter of (Z) at its intercepting surface 34, wherein the relationship of X>Y and X>Z and Y=Z is fulfilled. The annular air-guiding channel 33 is defined between the head portion 32 of the air guiding shell 3 and the housing 1, and the inlet holes 10 are located between the intercepting surface 34 and the second opening 320 of the air guiding shell 3, so that an current generated by the cooling fan 4 can pass through the annular air-guiding channel 33 and the inlet holes 10 to enter the housing 1 to take away the heat generated therein. The intercepting surface 34 of the air guiding shell 3, which is generally at the left side of the inlet holes 10, can intercept or guide the air current entering the annular air-guiding channel 33 to facilitate the air current passing through the inlet holes 10 to enter the housing 1 to dissipate the heat generated therein.

Of course, the second opening 320 or any cross section of the head portion 32 is not limited to be circular in shape. The head portion 32 of the air guiding shell 3 is configured such that the second opening 320 of the head portion 32 has a dimension greater than any cross section of the head portion 32.

Figure 5:
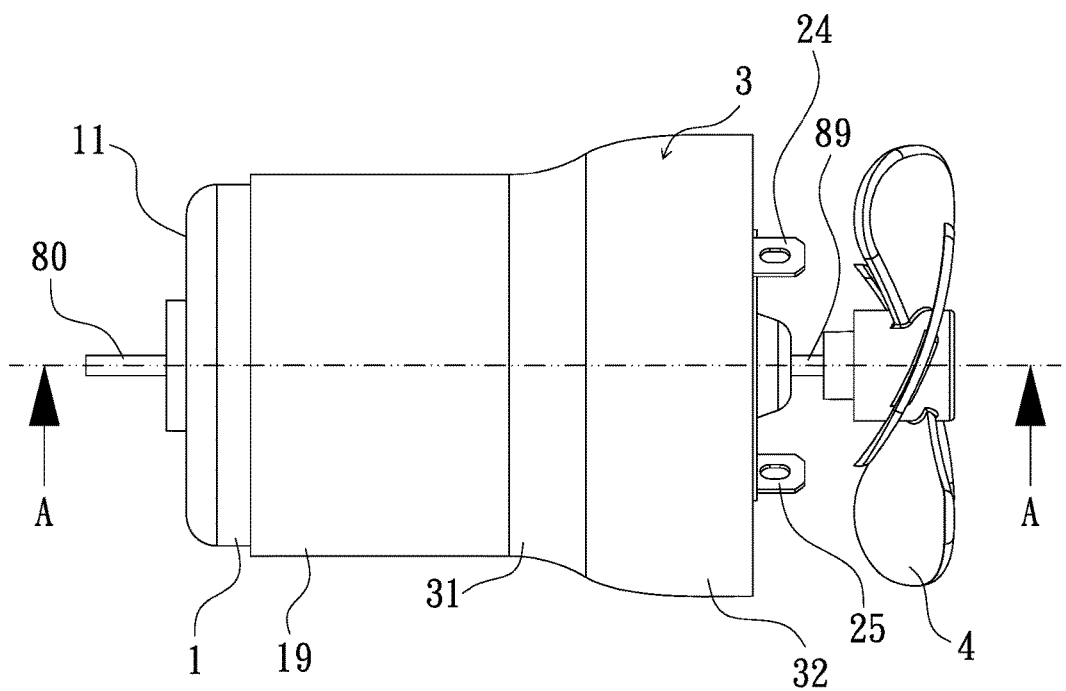
FIG. 5 shows a side view of the motor.
Figure 8:
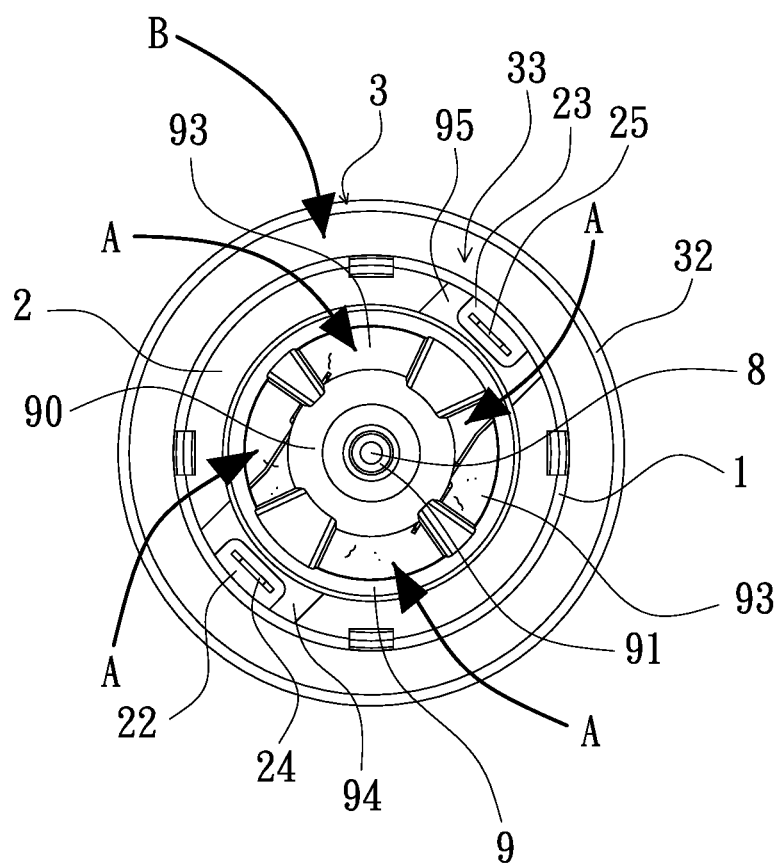
FIG. 8 shows a front view of the motor, wherein different portions of the air current, which respectively follow the airflow paths (A) (B) to enter the motor's housing for dissipating the heat generated in the motor, are manifested.

FIGS. 2 and 3 show one embodiment of the motor being assembled from the housing 1, the cover 2, the air collecting structure 9, the air guiding shell 3, and the cooling fan 4. When the motor is started, the cooling fan 4 can be rotated together with the rotating shaft 8 to generate a whirling, ongoing air current towards the cover 2 and the air collecting structure 9, so that the air at the right side of the cooling fan 4 can be forced to flow into the left side of the cooling fan 4 (see FIG. 5). In particular, the air current can enter the inner space of the housing 1 easily, and the heat generated in the housing 1 can be dissipated effectively through multiple paths (see FIGS. 5 through 9). A central portion of the air current generated by the cooling fan 4 can be guided by the outer ring and the conical surface 92 of the air collecting structure 9 to smoothly flow through the space between the outer ring and the conical surface 92 of the air guiding structure 9, and then to pass through the associated holes 26, 93 to enter the inner space of the housing 1, as indicated by the airflow path (A) shown in FIGS. 6 and 8. In addition, an outer portion of the air current, which is outside the area of the outer ring of the air collecting structure 9, can be divided into two sub-portions of air, one of which may follow the airflow path (B) while the other of which may follow the airflow path (C) (see FIG. 7). With the assistance of the intercepting surface 34 of the head portion 32, the sub-portion of the air current which follows the airflow path (B) to enter the annular air-guiding channel 33 may flow through the corresponding inlet holes 10 to enter the inner space of the housing 1 more easily, so that heat is not easy to accumulate in the housing 1 (see FIGS. 7, 8 and 9). The sub-portion of the air current which follows the airflow path (C), which does not enter the annular air-guiding channel 33, may flow along the outer surface of the housing 1 or the sleeve 19 (see FIGS. 6 and 7), so that the housing 1 can be effectively cooled down to facilitate dissipation of the heat generated in the housing 1. In this embodiment, the air current which has entered the inner space of the housing 1 can flow out of the housing 1 via the outlet holes 12 (see FIGS. 6 and 7), so that the heat generated in the housing 1 can be taken away with the leaving air current. The multiple airflow paths (A), (B) and (C) allow the heat generated in the housing 1 to dissipate more effectively, so that the motor can be prevented from burning out.

As a summary, the present invention employs the air collecting structure 9 fixed to the cover 2, and the air guiding shell 3 mounted around the housing 1 and the air collecting structure 9 to dissipate the heat generated in the housing 1 through multiple paths. The inlet holes 26 of the cover 2 and the through holes 93 of the air collecting structure 9 allow the motor of the present invention to provide an airflow path (A) via which a central portion of the air current generated by the cooling fan 4 enters the inner space of the housing 1 to dissipate the heat generated in the housing 1. Furthermore, the annular air-guiding channel 33 defined between the air guiding shell 3 and the housing 1, and the inlet holes 10 of the housing 1 allow the motor of the present invention to provide another airflow path (B) via which one sub-portion of an outer portion of the air current enters the inner space of the housing 1. Still furthermore, the present invention provides a further airflow path (C) via which another sub-portion of the outer portion of the air current flows along the outer surface of the housing 1 to lower the temperature of the housing 1 and thus to increase the capacity of dissipating the heat generated in the housing 1. Through multiple paths for heat dissipation, heat is not easy to accumulate in the housing 1 of the motor; therefore, maximum power output of the motor can be achieved, and thus the performance and service life of the motor can be increased. Even though the motor is operated in a high-temperature environment, it will not burn out. These features render the motor of the present invention useful and inventive.

I claim:

1. In a motor including a housing, a cover, a rotating shaft, and a cooling fan, wherein the housing has a surrounding wall defining therein an inner space with a front opening and has a rear closure wall opposite to the front opening, the rear closure wall defining a central hole and a plurality of outlet holes, the surrounding wall of the housing defining at least one inlet hole; the cover, which is substantially disk-shaped and closes the front opening of the housing, has a central hub defining a central hole; the rotating shaft is mounted across the inner space of the housing, the rotating shaft having a first end which is inserted through the central hole of the rear closure wall and having a second end which is inserted through the central hole of the cover; the cooling fan is fixed to the second end of the rotating shaft, so that the cooling fan is rotated together with the rotating shaft; wherein the improvement comprises:

the cover defines a plurality of inlet holes around its central hub; an air collecting structure, which is adapted to be fixed to the cover, has a central hub defining a central hole aligned with the central hole of the cover for allowing the second end of the rotating shaft to insert therethrough and has an outer ring around the central hub of the air collecting structure and defines a plurality of through holes, located between the outer ring and the central hub of the air collecting structure and aligned with the inlet holes of the cover, whereby a central portion of a whirling, ongoing air current generated by the cooling fan can flow through the space between the outer ring and the central hub of the air collecting structure and then flow through the through holes of the air collecting structure and the inlet holes of the cover to enter the inner space of the housing and finally flow out of the housing via the outlet holes for dissipating the heat generated in the housing.

2. The motor of claim 1, wherein an air guiding shell is mounted around the housing and the air collecting structure, the air guiding shell has a neck portion, a head portion having a dimension greater than the neck portion, and a gradually enlarged transitional portion integrally formed between the neck portion and the head portion, the neck portion opening out at a first opening, the head portion opening out at a second opening which is opposite to the first opening, the air guiding shell being mounted such that the neck portion is closely fitted around the-housing, and the head portion is located above the inlet hole of the housing, thus defining an annular air-guiding channel between the head portion and the housing, and forming an intercepting surface at an inner surface of the gradually enlarged transitional portion of the air guiding shell, the annular air-guiding channel communicating with the inlet hole of the housing and facing toward the cooling fan, the inlet hole of the housing being located between the intercepting surface and the second opening of the air guiding shell, whereby an outer portion of the air current can quickly pass through the annular air-guiding channel and the inlet hole of the housing to enter the housing to take away the heat generated therein.

3. The motor of claim 2, wherein the first and second openings of the air guiding shell are circular in shape, and the air guiding shell is a bell-shaped body such that the annular air-guiding channel has a cross-sectional dimension which increases gradually from the intercepting surface to the second opening of the air guiding shell.

4. The motor of claim 3, wherein the first opening of the air guiding shell has a diameter of (Y), the second opening of the air guiding shell has a diameter of (X), and the gradually enlarged transitional portion of the air guiding shell generally has an internal diameter of (Z) at its intercepting surface, wherein the relationship of X>Y and X>Z and Y=Z is fulfilled.

5. The motor of claim 2, wherein the second opening or any cross section of the head portion of the air guiding shell is non-circular in shape.

6. The motor of claim 1, wherein the cover is engaged with two sheaths provided at the housing so that the cover is installed to the housing and closes the front opening of the housing; two electrical terminal blades provided at the housing are inserted through the two sheaths to facilitate electrical connection for the motor.

7. The motor of claim 6, wherein the air collecting structure is provided with two U-shaped members capable of engaging with the two sheaths, so that the air collecting structure is fixed to the cover.

8. The motor of claim 1, wherein a sleeve made of a magnetically permeable metal is closely fitted around the surrounding wall of the housing to increase the performance of the motor.

* * * * *